Patented Nov. 9, 1948

2,453,564

UNITED STATES PATENT OFFICE 2,453,564

UREYLENETHIOPHANE CARBOXYLIC ACIDS AND ESTERS AND METHODS OF PREPARING SAME

Bernard R. Baker, Nanuet, N. Y., assignor, by mesne assignments, to American Cyanamid Company, New York, N. Y., a corporation of Maine No Drawing. Application July 16, 1945, Serial No. 605,467

12 Claims. (Cl. 260—329)

The present invention relates to new organic compounds and to methods of preparing the same. More particularly, it relates to ureylenethiophane carboxylic acids and to esters and salts thereof.

The novel compounds which can be prepared by methods of the present invention may be illustrated by the following general formula:

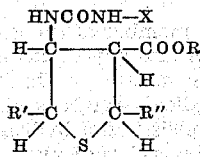

wherein X is a member of the group consisting of hydrogen, aliphatic and aromatic radicals, R is a member of the group consisting of hydrogen, alkyl and salt forming radicals and R' and R'' are members of the group consisting of hydrogen, carboxyalkyl and carbalkoxyalkyl radicals.

The compounds of the present invention are white crystalline solids. In the form of their esters they are soluble in chloroform, carbon tetrachloride, benzene, etc. They are relatively insoluble in water in the form of their esters and acids, but are soluble in the form of their alkali salts.

I prepare the compounds of the present invention by reacting a 3 or 4-carboxythiophane with thionyl chloride to form a thiophane acid chloride. The acid chloride is reacted with an alkali metal azide giving an azide derivative which on heating rearranges to an isocyanate derivative. This derivative treated with ammonia or a primary amine gives a substituted ureylenethiophane. Aromatic amines such as aniline, halogenated anilines, toluidines, naphthylamines, etc., are preferred, as the products obtained are crystalline solids easily purified. However, primary aliphatic amines such as, mono ethyl amine, mono ethanol amine, lauryl amine, stearyl amine, etc., may be employed if desired.

The intermediates which I prefer to use in carrying out my invention are prepared by the selective hydrolysis of a thiophane di- or tricarboxylic acid ester to a mono carboxythiophane as shown in my copending application Serial No. 605,468 filed July 16, 1945. Among these may be specifically mentioned: 2-(δ-carbomethoxybutyl)-3-carbomethoxythiophane-4-carboxylic acid, 2-(δ-carbethoxybutyl)-3-carbethoxythiophane-4-carboxylic acid, 2-(γ-carbomethoxypropyl)-3-carbomethoxythiophane-4-carboxylic acid, 2-(γ-carbethoxypropyl)-3-carbethoxythiophane-4-carboxylic acid, 2-(β-carbomethoxyethyl)-3-carbomethoxythiophane-4-carboxylic acid, 2-(β-carbethoxyethyl)-3-carbethoxythiophane-4-carboxylic acid, 2-carbomethoxymethyl-3-carbomethoxythiophane-4-carboxylic acid, 2-carbethoxymethyl-3-carbethoxythiophane-4-carboxylic acid, 3-carbomethoxythiophane-4-carboxylic acid, 3-carbethoxythiophane-4-carboxylic acid, 2-(δ-carbomethoxybutyl)-3-carboxy-4-carbomethoxythiophane, 2-(γ-carbethoxypropyl)-3-carboxy-4-carbethoxythiophane, 2-(β-carbomethoxyethyl)-3-carboxy-4-carbomethoxythiophane, 2-carbethoxymethyl-3-carboxy-4-carbethoxythiophane, and the like.

In preparing the compounds of my invention I heat a carboxythiophane such as those listed above, with thionyl chloride in a solvent such as benzene, chloroform, ether, carbon tetrachloride, etc. The temperature I can use is from about 20° to about 120° C. I prefer to use refluxing temperatures and to heat the reaction mixture from about 10 minutes to about 60 minutes. After removal of the solvent the residue is taken up in acetone and cooled to from 0° to 25° C. An aqueous solution of an alkali metal azide is added and the reaction mixture is kept preferably between 0° and 25° C. for from one-half hour to about two hours. The reaction mixture is diluted with water and extracted with a solvent such as chloroform, benzene or trichlorethylene. The chloroform extracts are dried and then refluxed for from 15 minutes to 60 minutes. The amine is added to the reaction mixture which is maintained at a temperature of from 0° to 80° C. for a period of from about 5 minutes to about 60 minutes.

The reaction product may be purified by washing with dilute hydrochloric acid, evaporating the solvent and recrystallizing the residue from a solvent such as methanol or a mixture of solvents such as benzene-petroleum ether.

The compounds prepared by methods of the present invention are in the form of their carboxylic acid esters. If the acids themselves are desired they can be prepared by heating the esters in a solvent in the presence of an alkali to obtain salts and acidifying to liberate the acids as shown in the specific examples.

The compounds of the present invention are useful as intermediates in the preparation of antivitamins and vitamins, such as biotin.

Our invention will now be illustrated in greater detail by means of the following specific examples, in which representative ureylenethiophanes are prepared from mono-carboxythiophanes. It will be understood, of course, that these examples are given for purposes of illustration and are not to be considered as limiting my invention to the particular details described therein.

Example 1

A solution of 1 g. of 2-(δ-carbomethoxybutyl)-3-carbomethoxythiophane-4-transcarboxylic acid and 1 cc. of thionyl chloride in 10 cc. of benzene was refluxed for twenty minutes, then evaporated. The residue was dissolved in 7 cc. of acetone and stirred with 0.25 g. of sodium azide in 7 cc. of water for one hour at 0° C., then diluted with water and extracted with chloroform. The dried extract was refluxed for thirty minutes, treated with 1 cc. of aniline and evaporated. The residue, dissolved in benzene, was washed with dilute hydrochloric acid and evaporated. The residue was purified by recrystallization from a benzene-petroleum ether mixture. The product, 2-(δ-carbomethoxybutyl)-3-carbomethoxy-trans-4-uranilinothiophane, was obtained as white crystals, melting point 121°–124° C.

The product prepared above when saponified with dilute alcoholic alkali in the usual manner gave 2-(δ-carboxybutyl)-4-uranilinothiophane-3-trans-carboxylic acid, melting point 190°–191° C. with decomposition.

Example 2

A mixture of 11.8 g. of crude 2-(δ-carbomethoxybutyl)-3-carbomethoxythiophane-trans-4-carboxylic acid, 12 cc. of thionyl chloride and 50 cc. of benzene was refluxed for fifteen minutes, then evaporated to dryness in vacuo (bath 50° C.). The evaporation was repeated with 25 cc. of benzene. The residual acid chloride, cooled in an ice bath, was dissolved in 50 cc. of acetone and added dropwise with stirring and ice cooling to a solution of 3.1 g. of sodium azide in 50 cc. of water at such a rate that the temperature was just below 10° C. After being stirred one hour at 0° C., the mixture was diluted with several volumes of water and extracted twice with chloroform. The extracts, after being dried over anhydrous calcium chloride at 0° C., were refluxed for thirty minutes, treated with 12 cc. of aniline and refluxed five minutes longer. Washed with dilute hydrochloric acid, the solution was evaporated to dryness and the residue crystallized from 60 cc. of methanol. The product was collected on a filter and washed with ice cold methanol. A yield of 6 g. of 2-(δ-carbomethoxybutyl)-3-carbomethoxy-trans-4-uranilinothiophane was obtained as crystalline material.

Example 3

To a hot solution of 2.6 g. of 2-(δ-carbomethoxy-butyl)-3-carbomethoxy-trans-4-uranilinothiophane in 50 cc. of methanol was added 15 cc. of 10% sodium hydroxide solution. After being boiled on a steam bath for one hour, during which time most of the methanol evaporated, the solution was diluted with water, clarified with Norite and acidified. The product was collected on a filter. A yield of 2.2 g. (92%) of 2-(δ-carboxybutyl)-3-carboxy-trans-4-uranilinothiophane was obtained having a melting point of 182°–183° C.

Example 4

A mixture of 3.8 g. of crude 3-carbomethoxythiophane-trans-4-carboxylic acid, 15 cc. of benzene and 4 cc. of thionyl chloride was refluxed for ten minutes, then evaporated to dryness in vacuo (bath 50° C.). The evaporation was repeated with 10 cc. more of benzene. The residue, cooled in ice, was dissolved in 20 cc. of acetone and added dropwise with stirring and ice cooling to a solution of 2 g. of sodium azide in 20 cc. of water. After being stirred one hour at 0° C., the mixture was diluted with several volumes of water and extracted twice with chloroform. The chloroform solution, dried over anhydrous calcium chloride at 0° C. was then refluxed for one hour, treated with 8 cc. of aniline and refluxed five minutes more. The solution was washed successively with dilute hydrochloric acid, dilute sodium bicarbonate and water. Evaporation gave an oil which crystallized on the addition of ether. A yield of 3.6 g. (64%) of trans-3-carbomethoxy-4-uranilinothiophane was obtained having a melting point of 130°–134° C.

The ester was saponified to trans-4-uranilinothiophane-3-carboxylic acid by alcoholic alkali in the usual manner. White crystals were obtained melting at 176° C. with decomposition.

I claim:

1. Chemical compounds having the general formula:

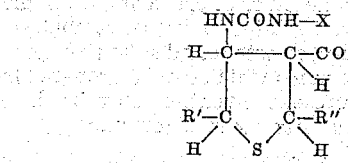

wherein X is a member of the group consisting of hydrogen, alkyl and aryl radicals, R is a member of the group consisting of hydrogen, alkyl and alkali metal radicals and R' and R" are members of the group consisting of hydrogen, carboxyalkyl and carbalkoxyalkyl radicals.

2. Chemical compounds having the general formula:

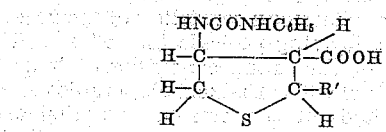

wherein R' is a carboxyalkyl radical.

3. 2-(delta-carbomethoxybutyl)-3-carbomethoxy-4-uranilinothiophane.

4. 2-(delta-carboxybutyl)-3-carboxy-4-uranilinothiophane.

5. 2-(delta-carboxybutyl)-3-uranilinothiophane-4-carboxylic acid.

6. A method of preparing compounds having the formula:

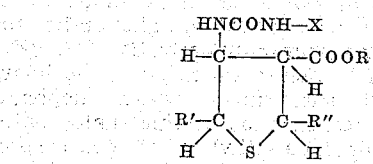

wherein X is a member of the group consisting of hydrogen, alkyl and aryl radicals, R is a member of the group consisting of hydrogen, alkyl and alkali metal radicals and R' and R" are members of the group consisting of hydrogen, carboxyalkyl and carbalkoxyalkyl radicals which comprises mixing a compound having the formula:

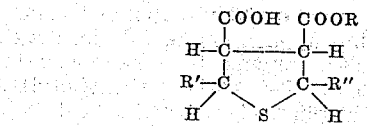

wherein R, R' and R" are as defined above, successively with thionyl cloride, an alkali metal azide and a member of the group consisting of primary alkyl amines, primary aryl amines and ammonia, in a solvent for said carboxythiophane.

7. A method of preparing compounds having the formula:

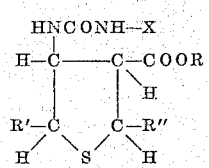

wherein X is a member of the group consisting of hydrogen, alkyl and aryl radicals, R is a member of the group consisting of hydrogen, alkyl and alkali metal radicals and R' and R'' are members of the group consisting of hydrogen, carboxyalkyl and carbalkoxyalkyl radicals which comprises suspending a compound having the formula:

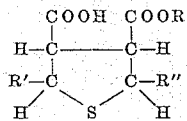

wherein R, R' and R'' are as defined above, in a solvent for said carboxythiophane and successively reacting with thionyl chloride at a temperature of 20° C. to 120° C., an alkali metal azide at a temperature of 0° C. to 25° C. and a member of the group consisting of primary alkyl amines, primary aryl amines and ammonia, at a temperature of from 0° C. to 80° C.

8. A method of preparing 2-(delta-carbomethoxybutyl)-3-carbomethoxy-4-uranilinothiophane which comprises mixing 2-(delta-carbomethoxybutyl)-3- carbomethoxythiophane -4- carboxylic acid successively with thionyl chloride, sodium azide and aniline in a solvent.

9. A method of preparing 2-(delta-carboxybutyl)-3-carboxy-4-uranilinothiophane which comprises mixing 2-(delta-carbomethoxybutyl)-3-carbomethoxythiophane-4-carboxylic acid successively with thionyl chloride, sodium azide and aniline in a solvent, hydrolyzing and recovering said 2-(delta-carboxybutyl)-3-carboxy-4-uranilinothiophane from the reaction mixture.

10. A method of preparing 2-(delta-carboxybutyl)-3-uranilinothiophane-4-carboxylic acid which comprises mixing 2-(delta-carbomethoxybutyl)-3-carboxy-4-carbomethoxythiophane successively with thionyl chloride, sodium azide and aniline in a solvent, hydrolyzing and recovering said 2 - (delta-carboxybutyl) - 3 - uranilinothiophane-4-carboxylic acid from the reaction mixture.

11. Chemical compounds having the general formula:

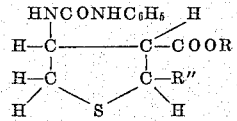

wherein R is an alkyl radical and R'' is a carbalkoxyalkyl radical.

12. A method of preparing compounds having the formula:

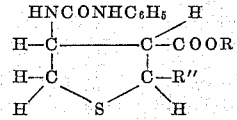

wherein R is an alkyl radical and R'' is a carbalkoxyalkyl radical which comprises mixing a 2-carbalkoxyalkyl-3-carbalkoxythiophane-4-carboxylic acid successively with thionyl chloride, sodium azide and aniline in a solvent for said carbalkoxythiophane.

BERNARD R. BAKER.

REFERENCES CITED

The following references are of record in the file of this patent:

UNITED STATES PATENTS

| Number | Name | Date |
|---|---|---|
| 2,382,418 | Hoffman | Aug. 14, 1945 |
| 2,400,436 | Patterson | May 14, 1945 |